US008352470B2

(12) United States Patent
Chen et al.

(10) Patent No.: US 8,352,470 B2
(45) Date of Patent: Jan. 8, 2013

(54) ADAPTIVE AGGREGATION: IMPROVING THE PERFORMANCE OF GROUPING AND DUPLICATE ELIMINATION BY AVOIDING UNNECESSARY DISK ACCESS

(75) Inventors: Ying Chen, San Jose, CA (US); Bin He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 12/126,831

(22) Filed: May 23, 2008

(65) Prior Publication Data

US 2009/0292704 A1 Nov. 26, 2009

(51) Int. Cl.
*G06F 7/00* (2006.01)

(52) U.S. Cl. ........................................................ 707/737

(58) Field of Classification Search .................. 707/737
See application file for complete search history.

(56) References Cited

U.S. PATENT DOCUMENTS

| | | | | |
|---|---|---|---|---|
| 5,511,190 | A | | 4/1996 | Sharma et al. |
| 5,717,915 | A | * | 2/1998 | Stolfo et al. ............................ 1/1 |
| 5,832,475 | A | | 11/1998 | Agrawal et al. |
| 6,182,061 | B1 | * | 1/2001 | Matsuzawa et al. .......... 707/737 |
| 6,381,601 | B1 | | 4/2002 | Fujiwara et al. |
| 6,775,682 | B1 | * | 8/2004 | Ballamkonda et al. ................ 1/1 |
| 6,947,934 | B1 | * | 9/2005 | Chen et al. .............................. 1/1 |
| 7,370,068 | B1 | * | 5/2008 | Pham et al. ............................. 1/1 |
| 7,593,926 | B2 | * | 9/2009 | Larson et al. .......................... 1/1 |
| 7,779,008 | B2 | * | 8/2010 | Dageville et al. .............. 707/737 |
| 2004/0230572 | A1 | * | 11/2004 | Omoigui ............................ 707/3 |
| 2007/0073676 | A1 | | 3/2007 | Carlson et al. |
| 2007/0255682 | A1 | * | 11/2007 | Brelsford et al. .................. 707/2 |
| 2008/0120302 | A1 | * | 5/2008 | Thompson et al. ............... 707/9 |
| 2009/0292704 | A1 | * | 11/2009 | Chen et al. ......................... 707/7 |
| 2010/0049766 | A1 | * | 2/2010 | Sweeney et al. .............. 707/737 |
| 2010/0088315 | A1 | * | 4/2010 | Netz et al. ...................... 707/737 |

OTHER PUBLICATIONS

Lim, Sung-Soo et al., "An Accurate Worst Case Timing Analysis for RISC Processors"., IEEE Transactions on Software Engineering. vol. 21, No. 7, Jul. 1995.*
Larson, Per-Ake, "Grouping and Duplicate Elimination: Benefits of Early Aggregation", Microsoft Corporation, Dec. 20, 1997, Technical Report MSR-TR-97-36.*
Douglas et al.; "Aggregation Sorting"; IBM Technical Disclosure Bulletin (TDB) 05-90 v32 n12 p. 230-237; IBM, USA.

(Continued)

*Primary Examiner* — Shyue Jiunn Hwa
*Assistant Examiner* — Muluemebet Gurmu
(74) *Attorney, Agent, or Firm* — Shimokaji & Assoc., PC (57) ABSTRACT

A method for use with an aggregation operation (e.g., on a relational database table) includes a sorting pass and a merging pass. The sorting pass includes: (a) reading blocks of the table from a storage medium into a memory using an aggregation method until the memory is substantially full or until all the data have been read into the memory; (b) determining a number k of blocks to write back to the storage medium from the memory; (c) selecting k blocks from memory, sorting the k blocks, and then writing the k blocks back to the storage medium as a new sublist; and (d) repeating steps (a), (b), and (c) for any unprocessed tuples in the database table. The merging pass includes: merging all the sublists to form an aggregation result using a merge-sort algorithm.

18 Claims, 6 Drawing Sheets

OTHER PUBLICATIONS

Graefe et al.; "Hash joins and hash teams in Microsoft SQL Server"; Proceedings of the Twenty-Fourth International Conference on Very-Large Databases; VLDB 1998, p. 86-97; New York, USA.

Mikhail Bilenko et al.; "Adaptive duplicate detection using learnable string similarity measures"; SIGKDD '03: Proceedings of the ninth ACM SIGKDD international conference on knowledge discovery and data mining; Aug. 2003, pp. 39-48; Washington, DC, USA.

D. Bitton et al.; "Duplicate record elimination in large data files."; *ACM Transactions on Database Systems* (*TODS*), 1983, 8(2):255-265, ACM; USA.

W. P. Yan et al.; "Data reduction through early grouping."; In *CASCON '94: Integrated Solutions*, Proceedings of the 1994 IBM CAS Conference, 1994, pp. 227-235, Toronto, Ontario, Canada.

* cited by examiner

ADAPTIVE AGGREGATION: IMPROVING THE PERFORMANCE OF GROUPING AND DUPLICATE ELIMINATION BY AVOIDING UNNECESSARY DISK ACCESS

BACKGROUND OF THE INVENTION

The present invention relates generally to the field of relational database management systems and, more specifically, to improving the performance of grouping and duplicate elimination by avoiding unnecessary disk access.

Aggregation is one of the major database operations in current relational database management systems (RDBMS). In SQL (sequential query language), aggregation can be done through either the GROUP BY clause (i.e., to compute "have aggregate" functions over groups of tuples) or the DISTINCT clause (i.e., to eliminate the duplicates). With the proliferation of data warehouse and data mining applications, aggregation becomes increasingly important in today's relational database management systems. Yet such aggregation operations are typically expensive and lengthy due to a large amount of disk I/O (input/output) operations performed and the large size of many databases.

Prior art efforts to enhance aggregation performance include in-memory duplicate elimination, which assumed that the data can be completely brought into memory, and sorting and de-duplication can be done in memory as well. When the relation size (e.g., the size of the RDBMS table) is larger than the memory size, the external merge sort can be used to complete the aggregation in two passes. In the first pass, data are read into the memory in batches; in-memory sorting is done for each batch; and then the sorted results are written to disk as a sublist. In the second pass, the sorted sublists are merged to form the final aggregate result. Such algorithms are currently widely in use in relational database management systems.

In addition, other revisions on the external merge sort approach have been tried to improve aggregation performance using "early-aggregation" techniques. Under such an approach, instead of delaying all the aggregation computation to the second pass, some aggregation operations are computed in the first pass as the sorted sublists are generated. This reduces the number of total disk blocks required to hold the sorted sublists and hence reduces the number of disk I/O operations. For example, one method performs early-aggregation at the sorting time—as each batch is sorted, the aggregation result is computed as well. Another method computes aggregation before sorting using a hash technique until the memory is full. At that time, the data are sorted and written back to disk.

It may be observed that even with such early-aggregation techniques, the existing methods incur a significant number of unnecessary disk I/O operations. In particular, when generating a sublist in the first pass, the prior art methods typically sort all the blocks in the memory and write them back to disk, even though in many situations not all blocks need to be sorted or written to disk.

SUMMARY OF THE INVENTION

In one embodiment of the present invention, a computer-implemented method for use with information stored in blocks on a storage medium includes: reading blocks of the information from the storage medium into a memory of the computer using an aggregation method; determining a number, k, of blocks to be written back to the storage medium from the memory; selecting k blocks from the memory, sorting the selected blocks, and writing the sorted blocks as a new sublist to the storage medium; iterating the steps of reading, determining, selecting, sorting, and writing sublists; and merging the sublists to form an aggregation result.

In another embodiment of the present invention, a database system includes: a table having tuples, the tuples stored in blocks on a computer-accessible storage medium, and the database system executes steps for: accessing the storage medium to read blocks of the table into a memory of the database system using an early-aggregation method; determining a number, k, of blocks to be written from the memory back to the storage medium; selecting k blocks from the memory, sorting the selected blocks, and accessing the storage medium to write the sorted blocks as a sublist; iterating the processes of reading, determining, selecting, sorting, and writing sublists, wherein the number of accesses to read blocks and write blocks is less than that required to read and write all blocks of the table; and merging the sublists to form an aggregation result.

In still another embodiment of the present invention, a computer program product for use with a relational database table having tuples stored in blocks on a computer-accessible storage medium comprises a computer useable medium including a computer readable program, wherein the computer readable program when executed on a computer causes the computer to: read blocks of the table from the storage medium into a memory of the computer using an early-aggregation before sort method until the memory is full or until all the blocks have been read into the memory; determine a number, k, of blocks to be written back to the storage medium from the memory; select k blocks from the memory, sort the selected blocks, and write back the sorted blocks as a sublist to the storage medium; iterate the steps of reading, determining, selecting, sorting, and writing sublists until each block has been read into the memory, wherein the total number of block reads and writes is less than that required to read and write all blocks of the table; and merge the sublists to form an aggregation result.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides for adaptive aggregation that improves on early-aggregation techniques by dynamically determining how many (e.g., k, described below) blocks to write back to disk storage and which blocks (e.g., any of the k blocks, recent-count ranking, or total-count ranking, described below) to write according to the runtime situation, which may depend, for example, on conditions such as the number of blocks that have already been read into memory from the relation and the number of blocks remaining unread on disk. Embodiments of the present invention may be applied wherever aggregation operations—such as grouping and duplicate elimination—are used in database applications. Aggregation operations are extensively used in today's databases, especially in the emerging business intelligence (BI) applications where aggregation is central to data warehousing and data cube.

Several optimization methods—such as the early-aggregation strategies—that speed up such aggregation operations as grouping and duplicate elimination have been proposed since the 1970s and are still widely used in all relational database management systems today. Although such strategies have merits, they still incur many unnecessary disk input/output (I/O) operations (also referred to as "accesses"). The adaptive aggregation methods of the present invention improve on and differ from these prior art strategies by selecting as few blocks to sort and write to disk as possible and as required according to the current runtime situation, and hence reduce the total number of disk I/O operations. In particular, when generating a sublist in the first pass, the prior art methods typically sort all the blocks in the memory and write them back to disk, even though in many runtime situations not all blocks need to be sorted or written to disk. By way of contrast, embodiments of the present invention differ from such prior art approaches by choosing only a subset of blocks and an optimal number of blocks to write to disk while performing early-aggregation. Thereby the present invention can significantly reduce the number of disk I/O accesses required, and hence enhance overall aggregation performance.

Figure 1:
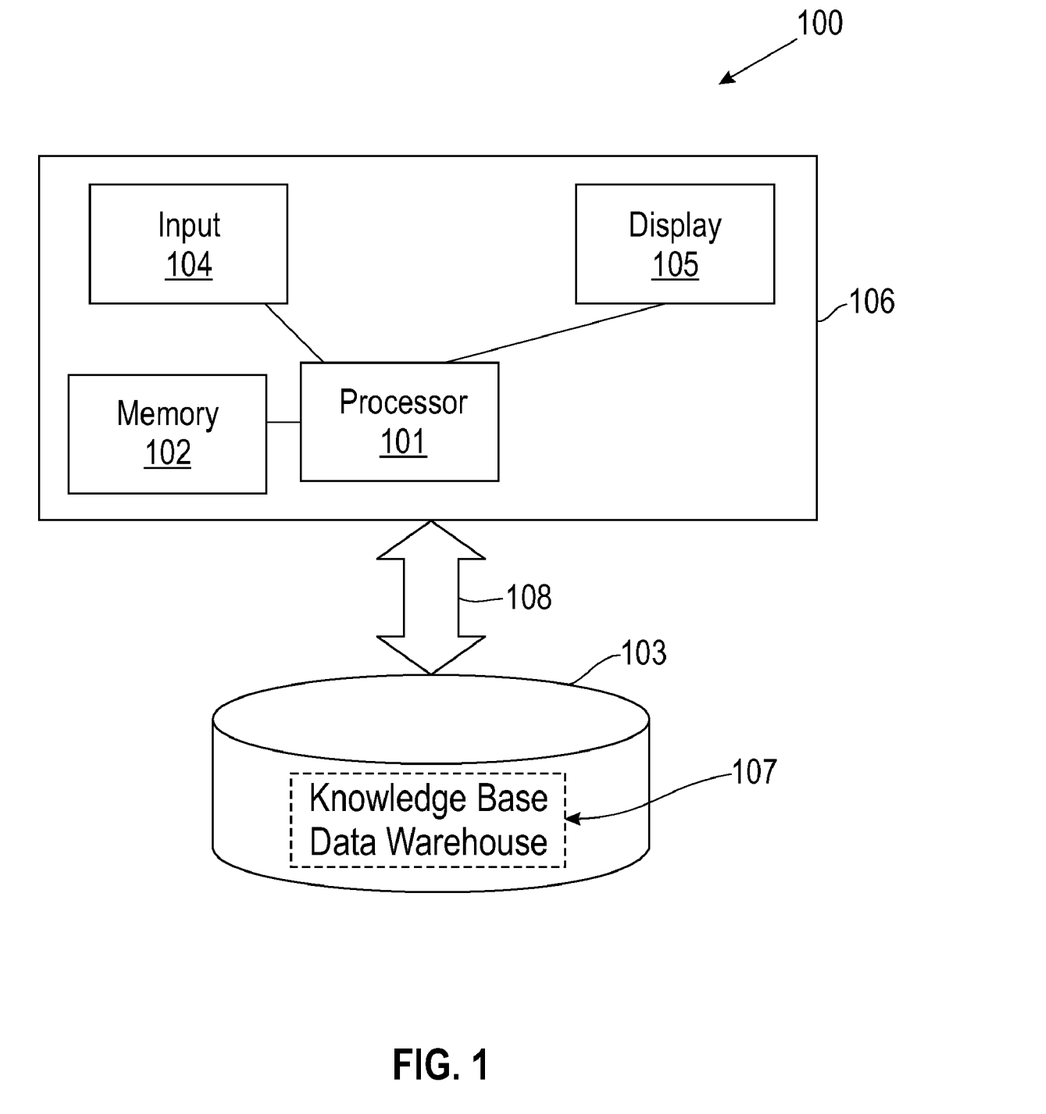
FIG. 1 is a system block diagram illustrating a database system in accordance with an embodiment of the present invention.

FIG. 1 illustrates database system 100 in accordance with one exemplary embodiment of the present invention. Database system 100 may comprise a computer system 106 that may include a computer processor 101, which may have a memory 102 and which may provide a means of input 104—such as a keyboard and mouse—and display 105—such as a printer or monitor—for a user of database system 100. Database system 100 may provide a user access to and ability to perform database operations on information available from a knowledge base data warehouse 107. For example, computer system 106 may provide an interface for a human user to access data warehouse 107. The data warehouse 107 may be implemented using computer-readable storage devices 103. Computer-readable storage devices 103 may communicate with computer system 106 via a network, electronic, or other communication path 108. Data warehouse 107 may contain documents that include, for example, business intelligence databases as well as other kinds of information that are helpful in analysis.

Figure 2:
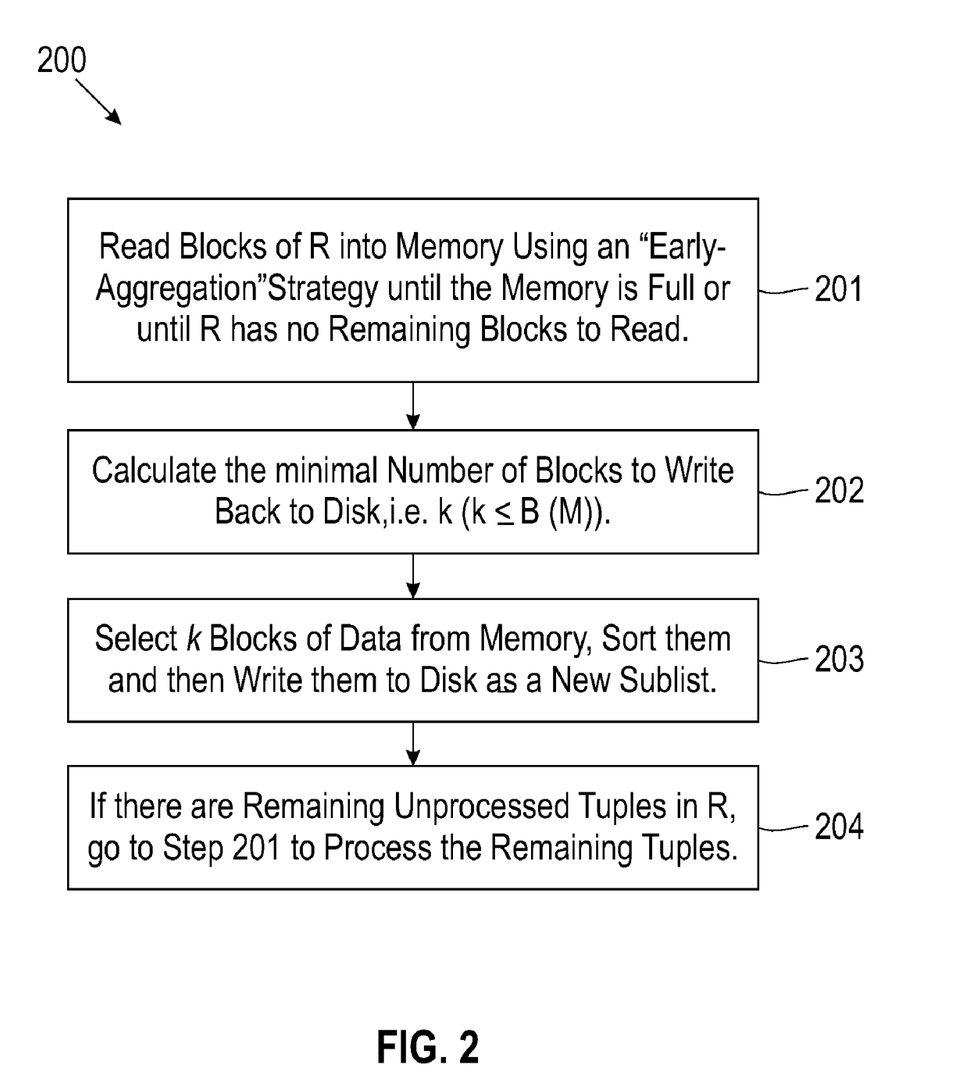
FIG. 2 is a flowchart illustrating a method for database aggregation operations in accordance with an embodiment of the present invention.

FIG. 2 illustrates an exemplary method 200, according to the present invention, for optimizing aggregation, called "adaptive aggregation", that builds upon a two-pass framework commonly found in aggregation methods. For example, the external merge-sort based algorithm known in the art would compute aggregation through two passes. In the first pass, data are divided into sublists based on the available memory size; then each sublist is read into memory, sorted, and written back to disk in the sorted fashion. The second pass merges the sorted sublists into the final result. Method 200 illustrates a general adaptive aggregation method for the first pass of such a two-pass framework.

Method 200 may perform the following steps, as shown in FIG. 2 and described more fully below: step 201, read blocks of R—which may be a relational database table of data warehouse 107, for example, stored as blocks of tuples in computer-readable storage devices 103, for example—into memory (e.g., memory 102) using an "early-aggregation before sorting" strategy until the memory is full or when R has no remaining blocks to read; step 202, calculate a minimal number of blocks to write back to disk, e.g., k ($k \leq B(M)$); step 203, select k blocks of data from memory, sort them and then write them back to disk as a new sublist; step 204, if there are remaining unprocessed tuples in R, go to step 201 to process the remaining tuples, i.e., perform another iteration of the first pass. Method 200 may be described as adaptive since it adjusts the number of blocks to be written back to disk in each iteration. Method 200 may be described as being composed of two subproblems to be tackled: 1) Given a specific situation, what is the optimal (e.g., minimal) k? and 2) Which k blocks should be written?

Figure 3:
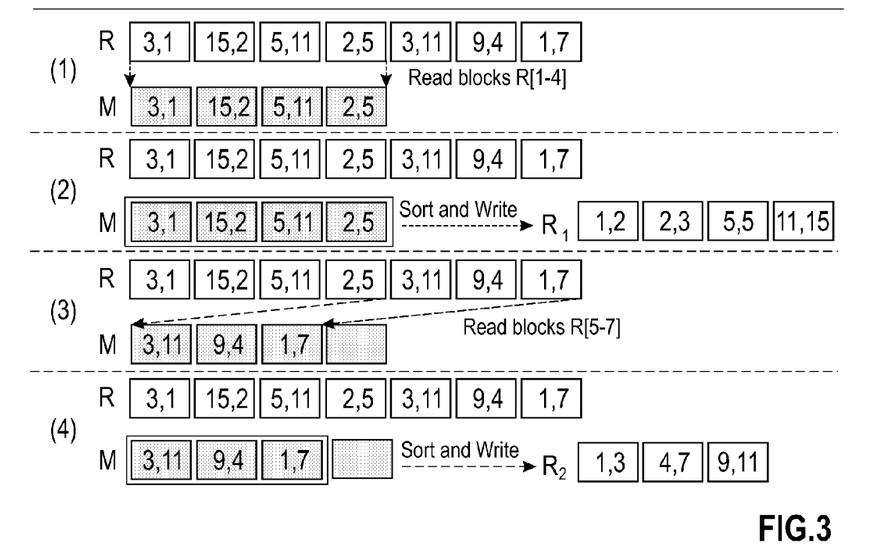
FIG. 3 is a process diagram illustrating a comparative example of an external merge-sort process applied to simplified example data used to illustrate the present invention.

FIG. 3 depicts a comparative example of an aggregation process applied to simplified data to illustrate an exemplary way the present invention can be used to eliminate unnecessary disk accesses. The simplified data of FIG. 3 may be used throughout FIGS. 4-9 to illustrate various alternative embodiments of method 200 by example. The example uses duplicate elimination operations, i.e., DISTINCT operations, as the example operations to be optimized. Grouping operations are extremely similar to the duplicate elimination operations. One difference is that in duplicate elimination, only the attributes involved in the aggregation (i.e., attributes in the DISTINCT clause or the entire tuple) need to be stored in memory, while in grouping both the attributes involved in the aggregation (i.e., attributes in the GROUP BY clause) and the results of the aggregate functions need to be stored.

Since the grouping aggregate results are typically small, an algorithm designed for duplicate elimination can work for grouping as well. As known in the art, for distributive aggregate functions (e.g., COUNT, SUM, MAX) and algebraic aggregate functions (e.g., AVG), the aggregate values can be incrementally computed using a constant number of variables. For instance, the COUNT function only needs one variable, i.e., the count value, and the AVG function needs two variables, the sum and the count.

To further simplify the illustrative example, without loss of generality, it is assumed that each tuple contains an integer only, and hence duplicate elimination must find all the unique integers.

The illustrative examples use R to represent a relation and M to represent the memory. The examples use B(R) to represent the number of disk blocks used to store the relation R and B(M) to represent the number of available blocks in memory. The examples use R[i] to denote the i-th block in R, and R[i-j] denotes a range of i-th block to j-th block in R. The examples assume that a relation has $R_t$ number of tuples and each disk block can hold $D_t$ tuples.

EXAMPLE 1

In Example 1 (and Examples 2-4), $R_t$=14, and $D_t$=2, i.e., each disk block can hold 2 tuples, and the available memory is 4 disk blocks (i.e., B(R)=7 and B(M)=4). In Example 1 (and Examples 2-4), the 14 tuples containing 14 integers in the table R may be denoted (3,1; 15,2; 5,11; 2,5; 3,11; 9,4; 1,7) (see FIG. 3). Here each integer represents a tuple content and each block is separated from the next block by a semicolon. R[1-4] would contain (3,1; 15,2; 5,11; 2,5), and R[7] contains (1,7). Since B(M)<B(R), an external merge-sort based aggregation algorithm is required for duplicate elimination.

The external merge-sort based algorithm can compute aggregation through two passes. In the first pass, data may be divided into sublists based on the available memory size. Then each sublist may be read into memory, sorted, and written back to disk in the sorted fashion. In the second pass, the sorted sublists may be merged into the final result. FIG. 3 illustrates the process and result of the first pass when using such external merge-sort based algorithm for the data of Example 1. As seen in FIG. 3, the original tuple set was divided into two sublists according to R[1-4] and R[5-7] respectively. Those two sublists were sorted and written to disk as $R_1$=(1,2; 2,3; 5,5; 11,15) and $R_2$(1,3; 4,7; 9,11) respectively, as shown in FIG. 3. In the second pass (not shown), the two sublists may be read and merged. There may be a total of 2*(4+3)+7=21 disk I/O operations.

The aggregation performance based on the external merge-sort can be improved by applying early-aggregation techniques, which may compute the intermediate aggregate results as the sublists are generated. Two commonly used early aggregation strategies are "early-aggregation during sort", illustrated in FIG. 4, and "early-aggregation before sort", illustrated in FIG. 5.

Figure 4:
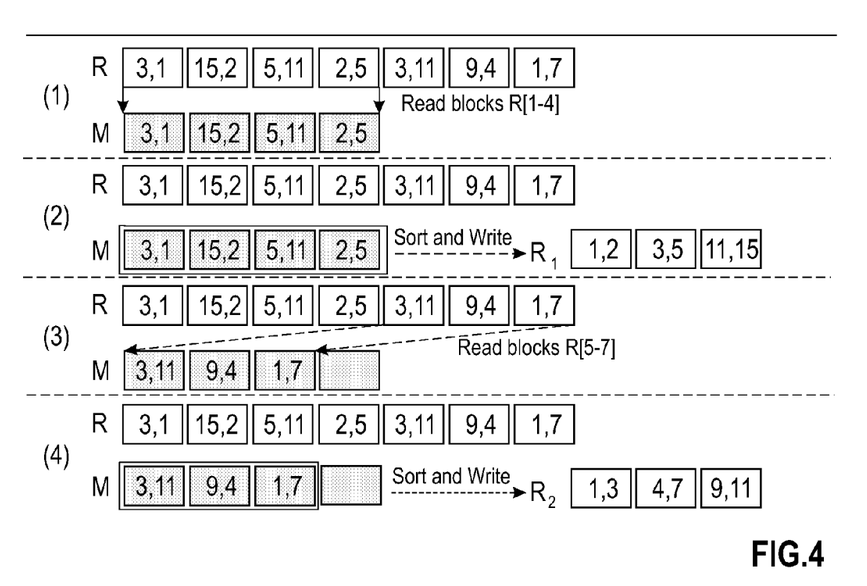
FIG. 4 is a process diagram illustrating a comparative example of an early-aggregation during sort process applied to the simplified example data used to illustrate the present invention.

The "early-aggregation during sort" strategy may eliminate duplicates during the time each sublist is sorted and written to disk in the first pass. For instance, FIG. 4 shows that for Example 1, the duplicate elimination was done on sublist (1,2; 2,3; 5,5; 11,15) (see $R_1$ in FIG. 3), which resulted in $R_1$=(1,2; 3,5; 11,15) (see FIG. 4). Thus, early-aggregation during sort shown in FIG. 4 writes back one disk block less than the external merge-sort shown in FIG. 3. The total number of disk I/O operations required for the early-aggregation during sort may be 7+2*(3+3)=19.

The "early-aggregation before sort" strategy may also eliminate duplicates by filtering duplicates out before the blocks are even sorted. Under this strategy, the system (e.g., system 100) may filter duplicates as each disk block is read into memory, until either memory is full or all disk blocks have been processed. In Example 1, six disk blocks (R[1-6]) can be brought into memory to form sublist $R_1$ as (1,2; 3,4; 5,9; 11,15) (see FIG. 5). The remaining sublist $R_2$ may have only one block (1,7) (R[7]). Under this early-aggregation before sort approach, only 17 disk I/O operations may be needed for the aggregation (i.e., 7+2*(4+1)=17).

The above early-aggregation strategies can be further enhanced since they may still contain many unnecessary disk I/O operations. For instance, in some cases, it may be possible to select a subset of blocks in the memory to sort and write to disk, instead of sorting and writing all memory blocks to disks as illustrated in FIGS. 1-5.

Figure 5:
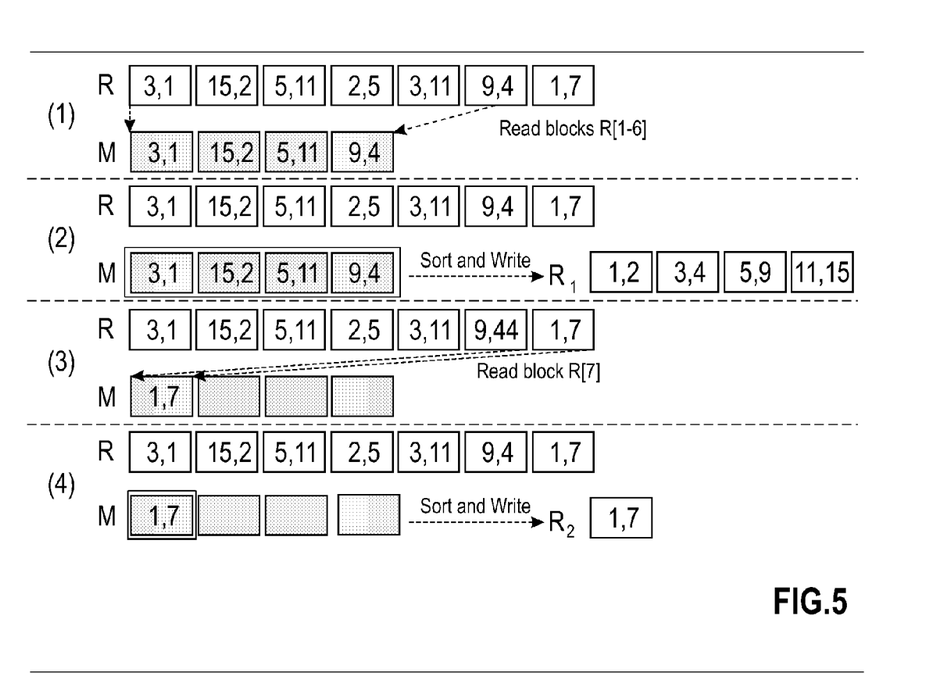
FIG. 5 is a process diagram illustrating an example of an early-aggregation before sort process applied to the simplified example data in accordance with an embodiment of the present invention.
Figure 6:
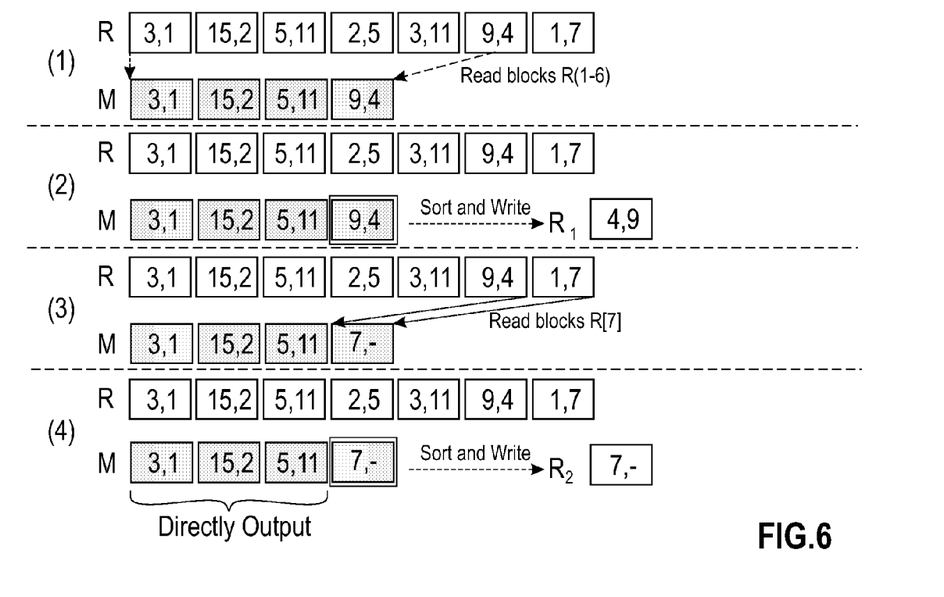
FIG. 6 is a process diagram illustrating an example of avoiding unnecessary disk access in the process illustrated by FIG. 5.

For example, in FIG. 5, when (3,1; 15,2; 5,11; 9,4) is formed from R[1-6], it is possible to choose to write only one block back to disk because there is only one disk block remaining on the disk (see FIG. 6). Suppose, as shown in FIG. 6, that block (9,4) is written out in the sorted fashion, as $R_1$=(4,9). The last block (1,7) can then be read into memory. The memory content becomes (3,1; 15,2; 5,11; 7,1). Since 1 is a duplicate in memory, (7,-) may be used to represent the NULL tuple after the duplicate elimination as seen in FIG. 6.

Under this approach, blocks (3,1), (15,2), and (5,11) may have never been written to disk and they can be directly output as partial results. Only the block (7,-) may need to be sorted and saved as a sublist $R_2$ as shown in FIG. 6. In the second pass (not shown), $R_2$ and $R_1$ can be merged and output as the second part of the final output. The total number of disk I/O operations for this strategy shown in FIG. 6 may be only 7+2*(1+1)=11. In this case, the write and read operations for $R_2$ could be avoided to further reduce the disk I/O operations to 9. That is, however, only a special situation.

It may be seen that the strategy illustrated in FIG. 6 may significantly enhance the aggregation performance (by reducing disk accesses) through intelligently selecting appropriate blocks in memory to write to disk. The sorting time for the data may also be reduced since only the selected blocks are sorted. The present invention focuses on disk operation optimization since they are the most time consuming operations in such aggregate computations.

Returning to the first subproblem for method 200—i.e., given a specific situation, what is the optimal (e.g., minimal) k?—method 200 may apply a "conservative" (also referred to as "worst-case") strategy or an "adjusted" conservative strategy for determining the number of blocks, as further described, respectively, below.

Figure 7:
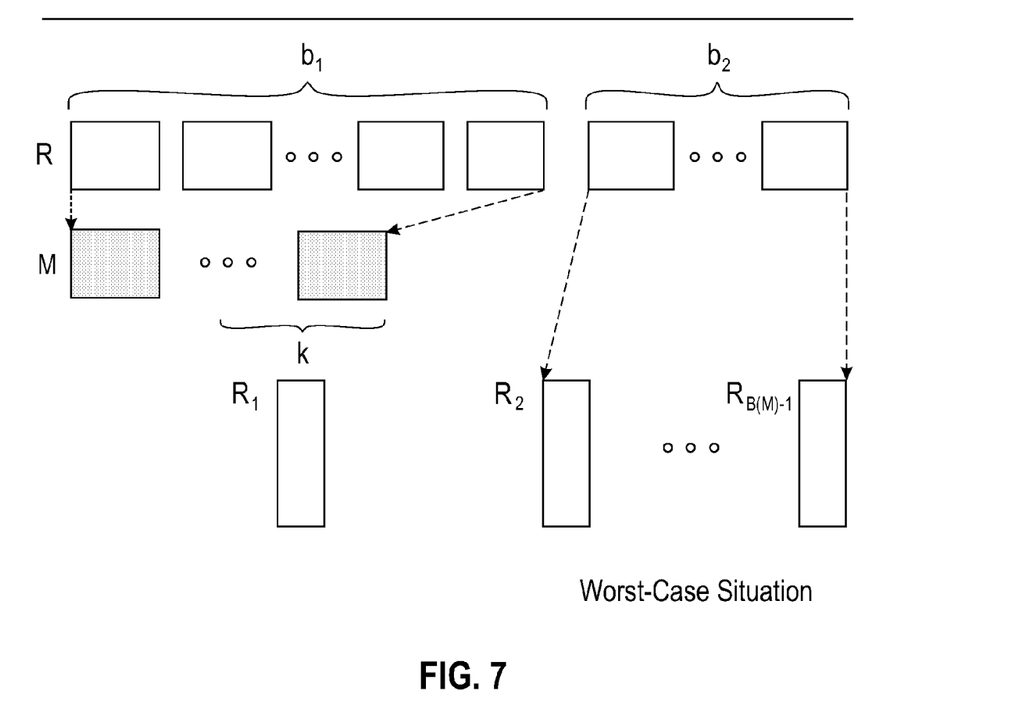
FIG. 7 is a data storage diagram used to illustrate a calculation made in accordance with one embodiment of the present invention.

For a conservative strategy, it may be assumed that in the first iteration of method 200, $b_1$ blocks of R are processed into memory and now memory is full. There maybe $b_2$ blocks remaining in $R_2$, i.e., $b_1+b_2$=B(R), as shown in FIG. 7. It may also be assumed that in the second pass (not shown), one block may be needed as an output buffer to output final aggregation results one block at a time. Hence, only B(M)−1 blocks may be available in memory (e.g., memory 102).

Since at the end of the first pass, method 200 may need to bring into memory at least one block from each sublist to perform the final sorting and outputting of the aggregated results, there can be at most B(M)−1 sublists. The first iteration of method 200 may need to write one sublist out, so the remaining $b_2$ blocks should be distributed into at most B(M)−2 sublists, as FIG. 7 illustrates, in order to allow final merge-sort in the second pass. In the worst case, when all tuples in $b_2$ have unique values, i.e., the sublist sizes cannot be reduced through aggregation, each sublist may have [$b_2$/(B(M)−2)] blocks, where the square brackets "[ ]" are used to denote the least integer greater than the expression inside the brackets, which may have a fractional value. In such cases, k must satisfy the following condition: k≧[$b_2$/(B(M)−2)]. This will ensure that $b_2$ blocks can be written into B(M)−2 sublists. Therefore, the minimal number of blocks to be written, k, should be [$b_2$/(B(M)−2)].

Similarly, in the second iteration of method 200, there may be $b_3$ blocks in R left on disk to be processed. The smallest k may be $[b_3/(B(M)-3)]$, based on the analysis presented above. In general, the same process may be repeated until all tuples in R are processed. In the i-th iteration, method 200 may select $k_i$ as the following:

$$k_i = \min(B(M), [b_{(i+1)}/(B(M)-i-1)]) \quad (1).$$

EXAMPLE 2

In the example illustrated in FIG. 6, in the first iteration, $b_1=6$ and $b_2=1$. According to Equation 1, $k_1=\min(4; [\frac{1}{2}])=1$, and thus only one block needs to be written to disk.

The total number of disk I/O operations using this adaptive strategy, including the first and second pass, may then be:

$$B(R) + 2 \times (\Sigma_{i=1}^{N-1} \min(B(M), [b_{(i+1)}/(B(M)-i-1)]) + k_N) \quad (2),$$

where N is the total number of iterations in the first pass. The last iteration may require special treatment. Since there are no more blocks from R to be read from disk, method 200 may sort all the tuples in memory and denote each of them as one of two types of tuples. The first type of tuples may refer to those tuples that were brought into memory during the first iteration of method 200 and were never written back to disk in the subsequent iterations. Such tuples survived all the aggregation operations in all generated sublists. Hence, they can be part of the final unique tuples to be output directly without further processing. The second type of tuples may refer to those tuples that were brought into memory after the first iteration (counted as $k_N$ in Equation 2), need to be sorted and written to disk as the last sublist, and merged and sorted with other sublists in the second pass.

In cases when the aggregate result needs to be sorted, e.g., a query with both GROUP BY and ORDER BY clauses, the first type of tuples described above cannot be directly output; they are merged and sorted with other sublists in the second pass. This may add some additional disk I/O operations on $k_N$ in the last iteration in Equation 2. This analysis has been done at the block level, rather than individual tuple level, even though in the last iteration method 200 may process data at the tuple level. Such differentiation does not materially affect the analysis.

For an adjusted conservative strategy, first note that the conservative strategy considers the worse-case scenario where all tuples in $b_2$ are unique, while in practice many tuples can be merged into the intermediate aggregation results in memory, and k can be more optimistically determined. In a simplified form, it may be assumed that the tuples of relation R have a duplicate factor f which may be defined as the average number of tuples having the same value ($f \geq 1$), and the duplicates have uniform distribution (e.g., any subset of the tuples have the same duplicate factor as the entire relation R). Then Equation 1 can be modified to take f into account as follows:

$$k = \min(B(M), [b_{(i+1)}/(f \times (B(M)-i-1))]) \quad (3).$$

In such cases, $b_{i+1}$ blocks can be reduced to $b_{i+1}/f$ blocks after early aggregation. With $f \geq 1$, k is, in general, smaller than otherwise, i.e., when duplication is not taken into account. Hence, a smaller number of disk blocks may need to be written to disk. Equation 2 can be modified accordingly:

$$B(R) + 2 \times (\Sigma_{i=1}^{N-1} \min(B(M), [b_{(i+1)}/(f \times (B(M)-i-1))]) + k_N) \quad (4).$$

The above analysis makes relatively simplistic assumptions about uniform duplicate distributions and knowledge of the duplicate factor. In practice, f may not be known ahead of time. An adaptive approach to progressively estimate the value of f as the method 200 processes more and more tuples from R may be used. In each iteration i, since method 200 may know (i.e., may keep track of) how many blocks were selected to be written to disk (say, $q_i$) and how many blocks have been read into memory up to iteration i, (say, $r_i$ blocks), then the average duplication factor, $f_i$, up to iteration i can be computed as the following:

$$f_i = r_i/(B(M) + q_i) \quad (5).$$

EXAMPLE 3

In the example shown in FIG. 6, in the first iteration, $r_1=6$ and $q_1=0$. According to Equation 5, $f_1=6/4=1.5$.

As can be seen, f can be recomputed after each iteration, using Equation 5. As more data is processed, $f_i$ may become a more accurate estimate of f as well. It may also be observed that as aggregations are done progressively in each iteration, $f_i$ is always smaller than or equal to the real f value, which is the average duplicate factor. In other words, $f_i$ is never an overly optimistic value that might cause too few blocks to be written back at the beginning and too many blocks to be processed at the end, leading to overall performance degradation.

Returning to the second subproblem for method 200—i.e., which k blocks should be written?—method 200 may apply a random strategy, a recent-count ranking strategy, or a total-count ranking strategy for selecting the blocks, as further described, respectively, below.

Once appropriate $k_i$ for each iteration is determined, a naive approach to selecting which blocks to write back as a new sublist could simply randomly select $k_i$ blocks to write to disk. This approach may, however, be suboptimal, since further speed-up can be obtained by selecting the "right" blocks from memory. It may be observed that each set of selected $k_i$ blocks may affect the value of $b_{i+1}$ in the next iteration. It may be desirable to minimize the number of remaining unprocessed blocks, $b_{i+1}$, by finding an optimal set of $k_i$ blocks to write to disk.

A challenge in selecting the right blocks to write may be that there is no prior knowledge about the blocks that have not yet been processed at runtime, yet identifying optimal blocks requires such knowledge. In order to bridge such a gap, a count-based selection strategy that predicts what blocks might be written based on prior aggregation operation patterns may enable selecting better candidates to write than otherwise. The insight behind this approach is the following: if a block has many early aggregation operations that have occurred on it, it may be likely to incur more aggregations in subsequent iterations. Hence, it may be a candidate to keep in memory rather than on disk.

To generalize this insight, method 200 may define E(i; g) as the number of early aggregation operations done for a group of tuples that have the same value (the group may be denoted as g), in the i-th iteration. Method 200 may define A(g) as the total number of early aggregation operations for the group of tuples, g, since they were brought into memory, i.e., $$A(g) = \Sigma_{i=s}^{t} E(i, g) \quad (6),$$

where s denotes the iteration when the tuple group g was first brought into memory and t denotes the current iteration.

Thus, method 200 may include a count-based ranking strategy to enhance selection of appropriate blocks to write back to disk as sublists. Count-based ranking strategies used by method 200 may include, for example, a rank by recent count strategy or a rank by total count strategy.

In rank by recent count, method 200 may rank groups by their E(i; g) values in each iteration, and compact tuples with lowest ranks into $k_i$ blocks to write out.

Rank by total count may be similar except that method 200 may rank groups by their A(g) values instead of E(i; g) values. When there is a tie situation, a random selection, for example, may be done to break the tie. It may be noted that the two ranking strategies trade recentness with history. Rank by recent count may predict more heavily based on the recent aggregation patterns, while rank by total count may predict based on total historical aggregation patterns.

EXAMPLE 4

Figure 8:
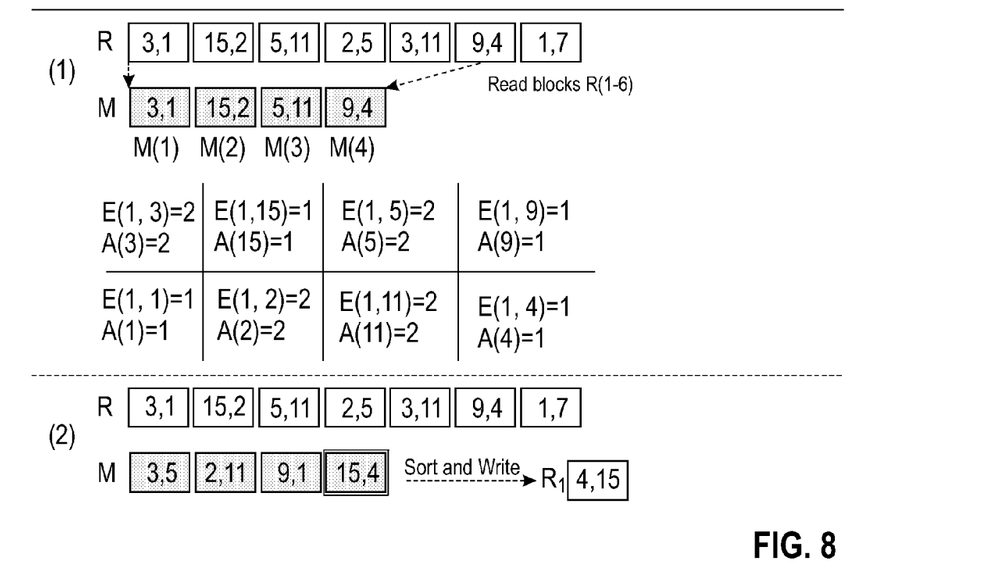
FIG. 8 is a process diagram illustrating an example of a first iteration selection process applied to the simplified example data in accordance with an embodiment of the present invention.
Figure 9:
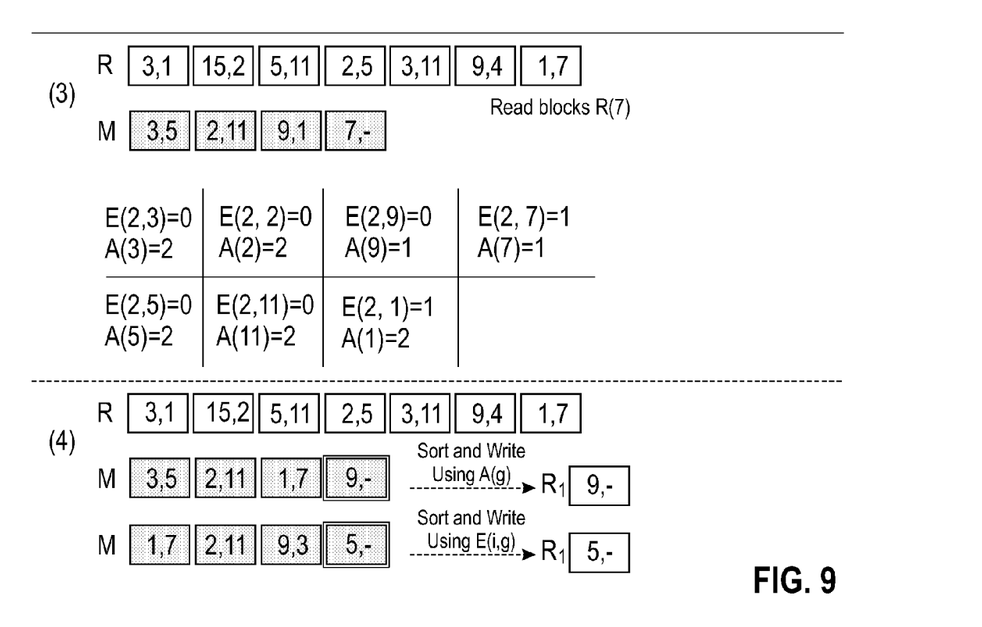
FIG. 9 is a process diagram illustrating an example of a second iteration selection process applied to the simplified example data in accordance with an embodiment of the present invention.

FIG. 8 shows all the E(i; g) and A(g) values for all groups of tuples in memory using the same example data from FIGS. 3-6. In this example, each group only has one tuple. For instance, E(1; 3)=2 since 3 occurs twice in R[1-6]. In the first iteration, A(g)=E(i; g) identically, so ranking by E(i; g) or A(g) would produce the same result. FIG. 8 shows that tuples 3,5,2,11 (each having E=A=2) are ranked before tuples 9,1, 15,4 (each having E=A=1). Since $k_1$=1 (see FIG. 6), only one block needs to be written out to disk. Method 200 may randomly choose two tuples from 9,1,15,4 and pack them into one block to write to disk, e.g., 4 and 15. In the second iteration, E(i; g) and A(g) were recomputed, as FIG. 9 shows. The values are different as E(i; g) may only examine the recent aggregation patterns while A(g) may use the historical sums.

Since both ranking approaches may predict appropriate blocks to write based on observed aggregation patterns, it may be difficult to conclude that one approach may perform significantly better than the other. In practice, a decision on which ranking function to use could be based on user knowledge, on data, or experiences gained over time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A computer-implemented method for use with information stored in blocks on a storage medium, comprising:
   using an aggregation method, reading blocks of the information from the storage medium into a memory of the computer until the memory is full or until all the information has been read into the memory;
   removing duplicates of the blocks as each respective disk block is read into the memory of the computer;
   determining a number, k, of blocks to be written back to the storage medium from the memory, wherein k is an estimate of how many blocks need to be written back to the storage medium, based on an estimate of the extent of duplication within the information;
   selecting k blocks from the memory, sorting the selected blocks, ranking a group of the selected k blocks based on a number of early aggregation operations done for a group of the selected k blocks with a same value, and writing the sorted blocks with lowest rank as a new sublist to the storage medium;
   iterating the steps of reading, determining, selecting, sorting, and writing sublists;
   merging the sublists to form an aggregation result; and
   outputting partial results of the forming of the aggregation result without writing the partial results to disk.

2. The method of claim 1, wherein the aggregation method is an early-aggregation before sort method.

3. The method of claim 1, wherein the step of iterating comprises iterating the steps of reading, determining, selecting, sorting, and writing sublists until all the information has been processed.

4. The method of claim 1, wherein k is an estimate of how a lot of blocks need a number of blocks to be written back to the storage medium for each iteration.

5. The method of claim 1, wherein selecting k blocks from the memory comprises:
   randomly selecting the blocks from the memory.

6. The method of claim 2, wherein selecting k blocks from the memory comprises:
   selecting the blocks from the memory according to how many a number of early-aggregations the blocks participated in during a most recent previous iteration.

7. The method of claim 2, wherein selecting k blocks from the memory comprises:
   selecting the blocks from the memory according to how many a number of early-aggregations the blocks participated in during all previous iterations.

8. The method of claim 1, wherein the information comprises tuples in a database.

9. A database system, the database system including a table having tuples, the tuples stored in blocks on a computer-accessible storage medium, the database system executing steps for:

accessing the storage medium to read blocks of the table into a memory of the database system using an early-aggregation method until the memory of the database system is full or until all the blocks of the table have been read into the memory of the database system;

determining a number, k, of blocks from the memory to be written from the memory back to the storage medium, wherein k is an estimate of how many blocks from the memory of the database system need to be written back to the storage medium, based on an estimate of the extent of duplication within the memory of the database system;

selecting k of the blocks from the memory, sorting the selected blocks, ranking a group of the selected k blocks based on a total number of early aggregation operations done for a group of the selected k blocks, and accessing the storage medium to write the sorted blocks with the lowest rank as a sublist;

iterating the processes of reading, determining, selecting, sorting, and writing sublists, wherein the number of accesses to read blocks and write blocks is less than that required to read and write all blocks of the table;

directly outputting to a computer display those blocks from the table that were brought into the memory of the database system for multiple iterations of the reading of the sublists from the computer-accessible storage medium;

sorting the sublists after each of a plurality of instances of the reading of the sublists; and merging the sublists to form an aggregation result.

10. The system of claim 9, wherein the determining step comprises:

calculating a worst-case estimate of the number, k, of blocks to be written back for each iteration according to a formula:

$$k=\min(B(M), [b/(B(M)-i-1)]), \text{ wherein } (B(M)-i-1)\neq 0,$$
and wherein $B(M)$ denotes the number of blocks that can be held in the memory, b denotes the number of blocks remaining to be read from the storage medium at a current iteration and i counts the current iteration.

11. The system of claim 9, wherein the determining step comprises:

calculating an adjusted worst-case estimate of the number, k, of blocks to be written back for each iteration according to a formula:

$$k=\min(B(M), [b/(f\times(B(M)-i-1))]), \text{ wherein } (B(M)-i-1)\neq 0, \text{ and}$$

wherein $B(M)$ denotes the number of blocks that can be held in the memory, b denotes the number of blocks remaining to be read from the storage medium at a current iteration, f denotes an estimate up to the current iteration of the average number of tuples having the same value, and i counts the current iteration.

12. The system of claim 10, wherein:

the number of accesses to read blocks and write blocks is no more than:

$$B(R)+2\times(\Sigma_{i=1}^{N-1}\min(B(M), [b_{(i+1)}/(B(M)-i-1)])+k_N),$$
wherein $(B(M)-i-1)\neq 0,$ and wherein $B(R)$ denotes the number of blocks of the table, i counts the iterations, N is the total number of iterations, $B(M)$ denotes the number of blocks that can be held in the memory, and $b_{(i+1)}$ denotes the number of blocks remaining to be read from the storage medium at the i-th iteration.

13. The system of claim 11, wherein the number of accesses to read blocks and write blocks is no more than:

$$B(R)+2\times(\Sigma_{i=1}^{N-1}\min(B(M), [b_{(i+1)}/(f\times(B(M)-i-1))])+k_N), \text{ wherein } (B(M)-i-1)\neq 0,$$

and wherein $B(R)$ denotes the number of blocks of the table, i counts the iterations, N is the total number of iterations, $B(M)$ denotes the number of blocks that can be held in the memory, $b_{(i+1)}$ denotes the number of blocks remaining to be read from the storage medium at the i-th iteration, and f denotes an estimate up to the i-th iteration of the average number of tuples having the same value.

14. A computer program product for use with a relational database table having tuples stored in blocks on a computer-accessible storage medium, the computer program product comprising a computer useable medium including a computer readable program, wherein the computer readable program when executed on a computer causes the computer to:

read blocks of the table from the storage medium into a memory of the computer using an early-aggregation before sort method until the memory is full or until all the blocks have been read into the memory, determine a number, k, of blocks to be written back to the storage medium from the memory, wherein k is an estimate of how many blocks from the memory of the computer need to be written back to the storage medium, based on an estimate of the extent of duplication within the memory of the computer;

select k blocks from the memory, sort the selected blocks, rank the selected k blocks, randomly select equally ranked blocks, and write back the sorted lowest ranked blocks as a sublist to the storage medium;

keep those blocks of the table which have multiple prior aggregations in the memory of the computer until the sorted lowest ranked blocks are written as a sublist to the storage medium;

iterate the steps of reading, determining, selecting, sorting, and writing sublists until each block has been read into the memory, wherein the total number of block reads and writes is less than that required to read and write all blocks of the table;

sort partial results after each of a plurality of instances of the reading of the sublists; and merge the sublists to form an aggregation result.

15. The product of claim 14, wherein the determining step comprises:

calculating k based on the number of blocks that can be held in the memory, and the number of blocks remaining to be read from the storage medium at a current iteration.

16. The product of claim 14, wherein the determining step comprises:

calculating k based on the number of blocks that can be held in the memory, the number of blocks remaining to be read from the storage medium at a current iteration, and an estimate up to the current iteration of the average number of tuples having the same value.

17. The product of claim 14, wherein selecting k blocks from the memory comprises:

ranking groups of tuples by the number of early-aggregation operations done for a group of tuples having the same value in a current iteration; and selecting the blocks from the memory to write back according to which blocks have the lowest ranked tuples.

18. The product of claim 14, wherein selecting k blocks from the memory comprises:
ranking groups of tuples by the number of early-aggregation operations done for a group of tuples having the same value in all previous and current iterations; and
selecting the blocks from the memory to write back according to which blocks have the lowest ranked tuples.

* * * * *